(12) United States Patent
Gong

(10) Patent No.: US 9,657,892 B1
(45) Date of Patent: May 23, 2017

(54) SUPPORTER FOR ELECTRONIC DEVICE

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Zheng Gong, Shenzhen (CN)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/141,849

(22) Filed: Apr. 29, 2016

(30) Foreign Application Priority Data

Feb. 22, 2016 (CN) .......................... 2016 1 0095737

(51) Int. Cl.
| | | |
|---|---|---|
| F16M 11/00 | (2006.01) | |
| F16M 13/02 | (2006.01) | |
| F16M 11/38 | (2006.01) | |
| A47B 23/06 | (2006.01) | |
| A45F 5/00 | (2006.01) | |
| F16M 11/40 | (2006.01) | |

(52) U.S. Cl.
CPC ............... *F16M 13/02* (2013.01); *A45F 5/00* (2013.01); *A47B 23/06* (2013.01); *F16M 11/38* (2013.01); *F16M 11/40* (2013.01); *A45F 2005/002* (2013.01); *A45F 2200/0516* (2013.01); *A45F 2200/0525* (2013.01)

(58) Field of Classification Search
CPC ........ F16M 11/10; F16M 13/00; F16M 11/38; F16M 13/02; F16M 2200/08; F16M 11/041; F16M 2200/024; F16M 11/2021; F16M 13/022; F16M 11/28; F16M 11/00; F16M 11/24; F16M 11/2014; F16M 11/105
USPC ..... 248/447, 458, 459, 460, 461, 150, 346.5
See application file for complete search history.

(56) References Cited

U.S. PATENT DOCUMENTS

| | | | | |
|---|---|---|---|---|
| 4,234,148 A * | 11/1980 | Maddestra | ............. | A47G 1/142 211/72 |
| 5,397,081 A * | 3/1995 | Landry | ................. | A47B 91/00 248/346.5 |
| 5,607,135 A * | 3/1997 | Yamada | ............... | A47B 23/043 248/447 |
| 7,527,228 B2 * | 5/2009 | Chung | ................... | F16M 11/00 248/154 |
| 9,303,810 B2 * | 4/2016 | Adams | ................... | F16M 11/38 |

(Continued)

*Primary Examiner* — Steven Marsh
(74) *Attorney, Agent, or Firm* — Steven Reiss

(57) ABSTRACT

A supporter includes a connecting body, a pair of supporting plates, and a pair of supporting arms. The pair of supporting plates is rotatably connected to the connecting body. The pair of supporting arms is rotatably connected to the supporting plates. When the supporter is in an open state, the pair of supporting arms are rotated to rest against each other. The pair of supporting arms and the corresponding supporting plates respectively form an angle therebetween so that the supporting arms and corresponding supporting plates are positioned in a manner to cooperatively support an electronic device. When the supporter is in a close state, the pair of supporting arms are received in the receiving chambers.

19 Claims, 5 Drawing Sheets

(56) References Cited

U.S. PATENT DOCUMENTS

2003/0001064 A1* 1/2003 Book .................. A47B 21/045
248/460

* cited by examiner

SUPPORTER FOR ELECTRONIC DEVICE

FIELD

The disclosure generally relates to supporters, and particularly to a supporter for electronic device for supporting one or two electronic devices in an inclined degree.

BACKGROUND

Many electronic devices, such as mobile phones or tablet computer, are now commonly used. Supporters are used for supporting the electronic devices at an incline for convenient operation. However, the supporters commonly have a relative larger size and are difficult to carry.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
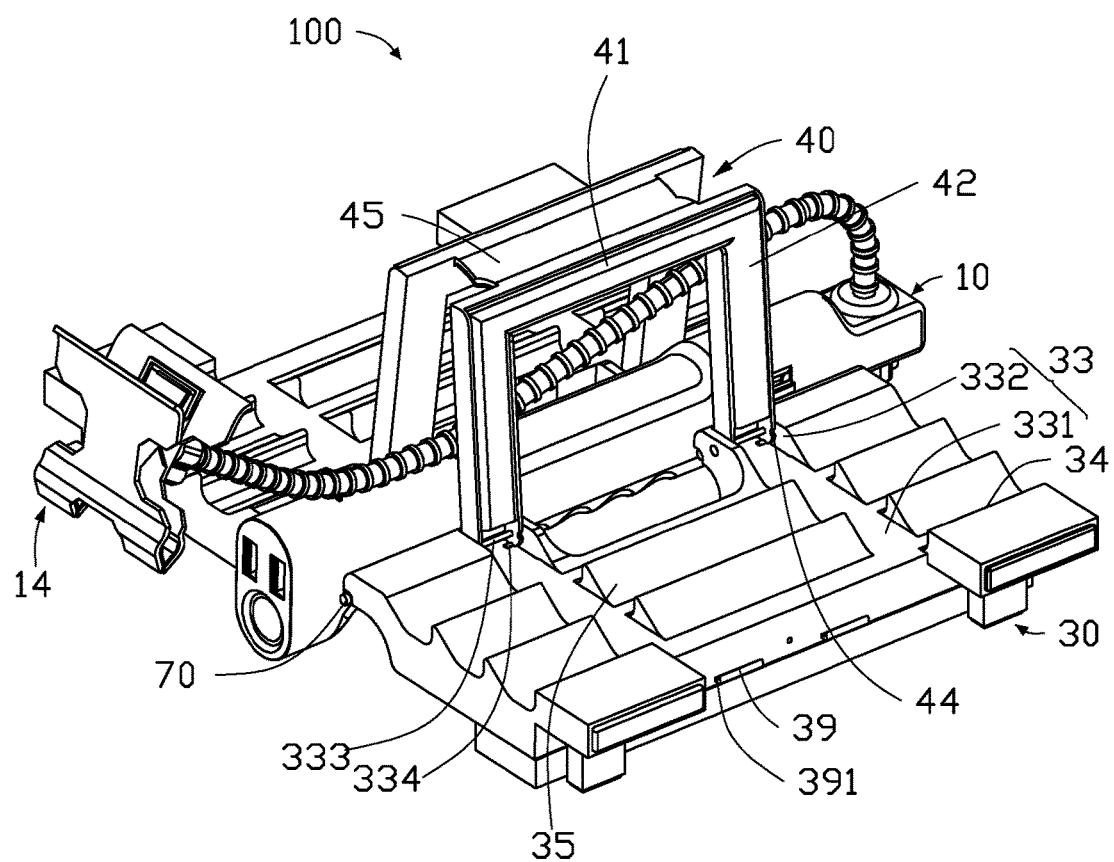
FIG. 1 is an isometric view of a supporter for electronic device in an open state, according to an exemplary embodiment.

It will be appreciated that for simplicity and clarity of illustration, where appropriate, reference numerals have been repeated among the different figures to indicate corresponding or analogous elements. In addition, numerous specific details are set fourth in order to provide a thorough understanding of the embodiments described herein. However, it will be understood by those of ordinary skill in the art that the embodiment described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

FIG. 1 is an isometric view of a supporter for electronic device in an open state, according to an exemplary embodiment. The supporter 100 is used to receive and support one or two electronic devices 50. The electronic devices 50 can be mobile phones, or tablet computers.

Figure 2:
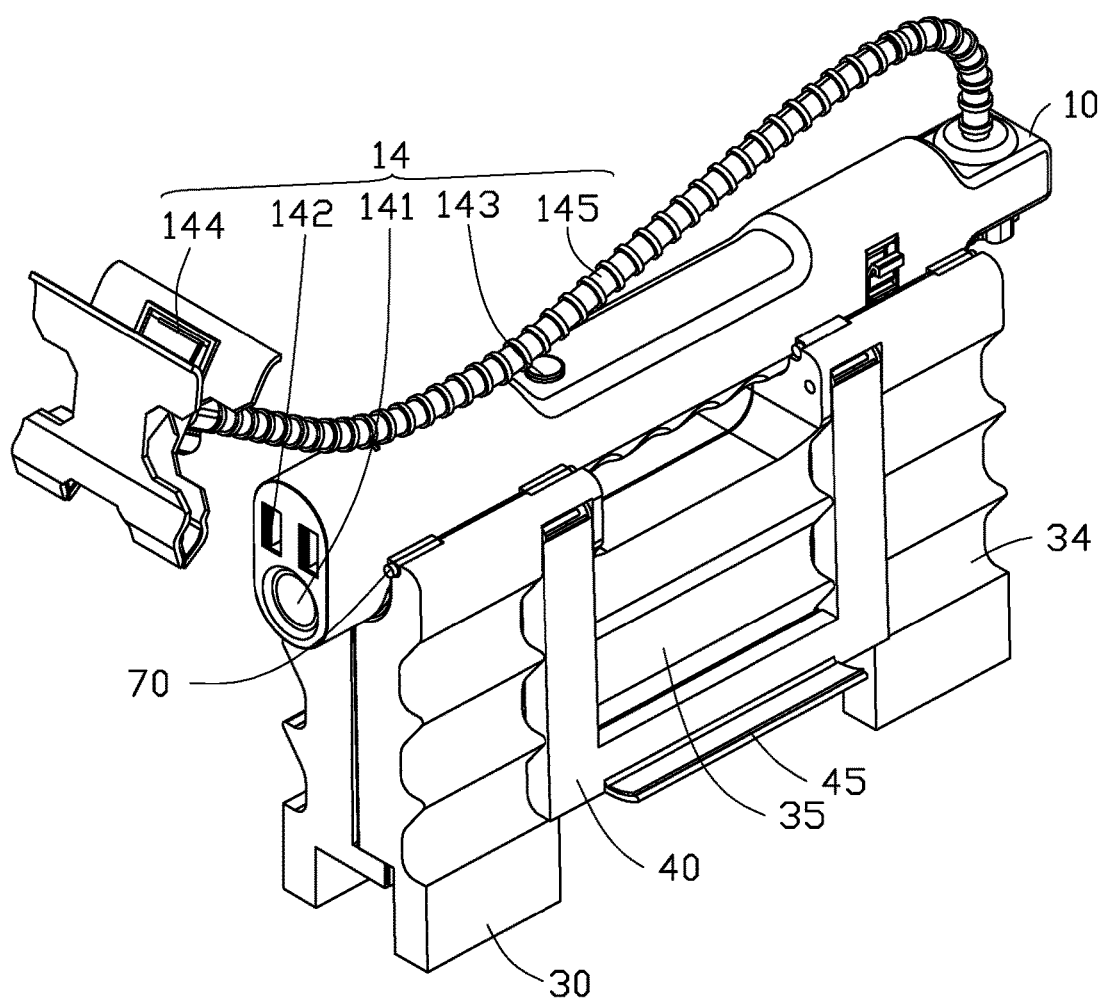
FIG. 2 is an isometric view of the supporter for electronic device of FIG. 1, in an close state.

FIG. 2 illustrates that the supporter 100 includes a connecting body 10, a pair of supporting plates 30, and a pair of supporting arms 40. The pair of supporting plates 30 are rotatably connected to the connecting body 10 by rotating shafts 70. The pair of supporting arms 40 are rotatably connected to the pair of connecting plates 30 and can be received in the pair of the connecting plates 30. The electronic devices 50 can be placed on the supporting plates 30 and supported by the supporting arms 40.

Figure 3:
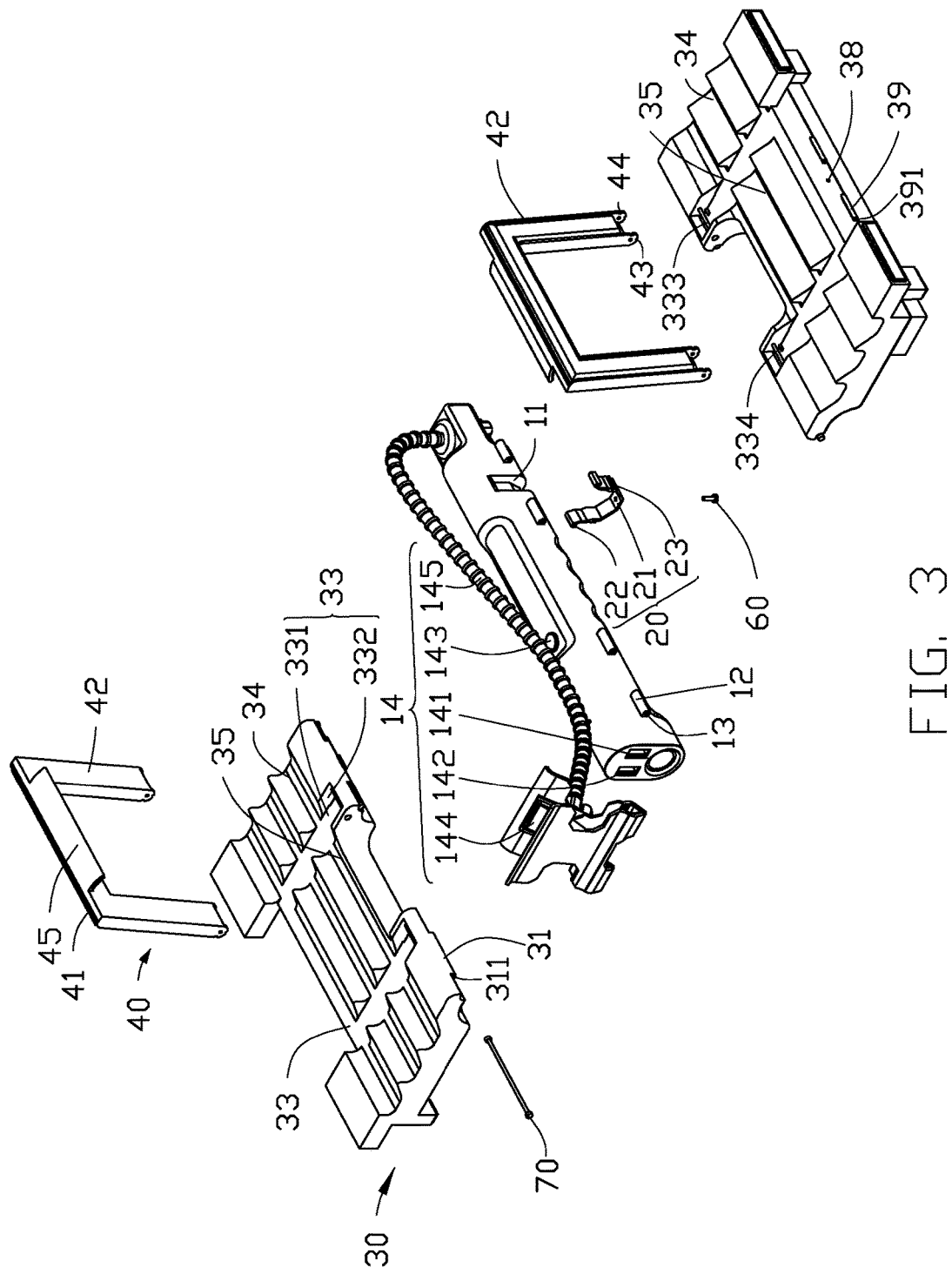
FIG. 3 is an assembled, isometric view of the supporter for electronic device of FIG. 1.
Figure 4:
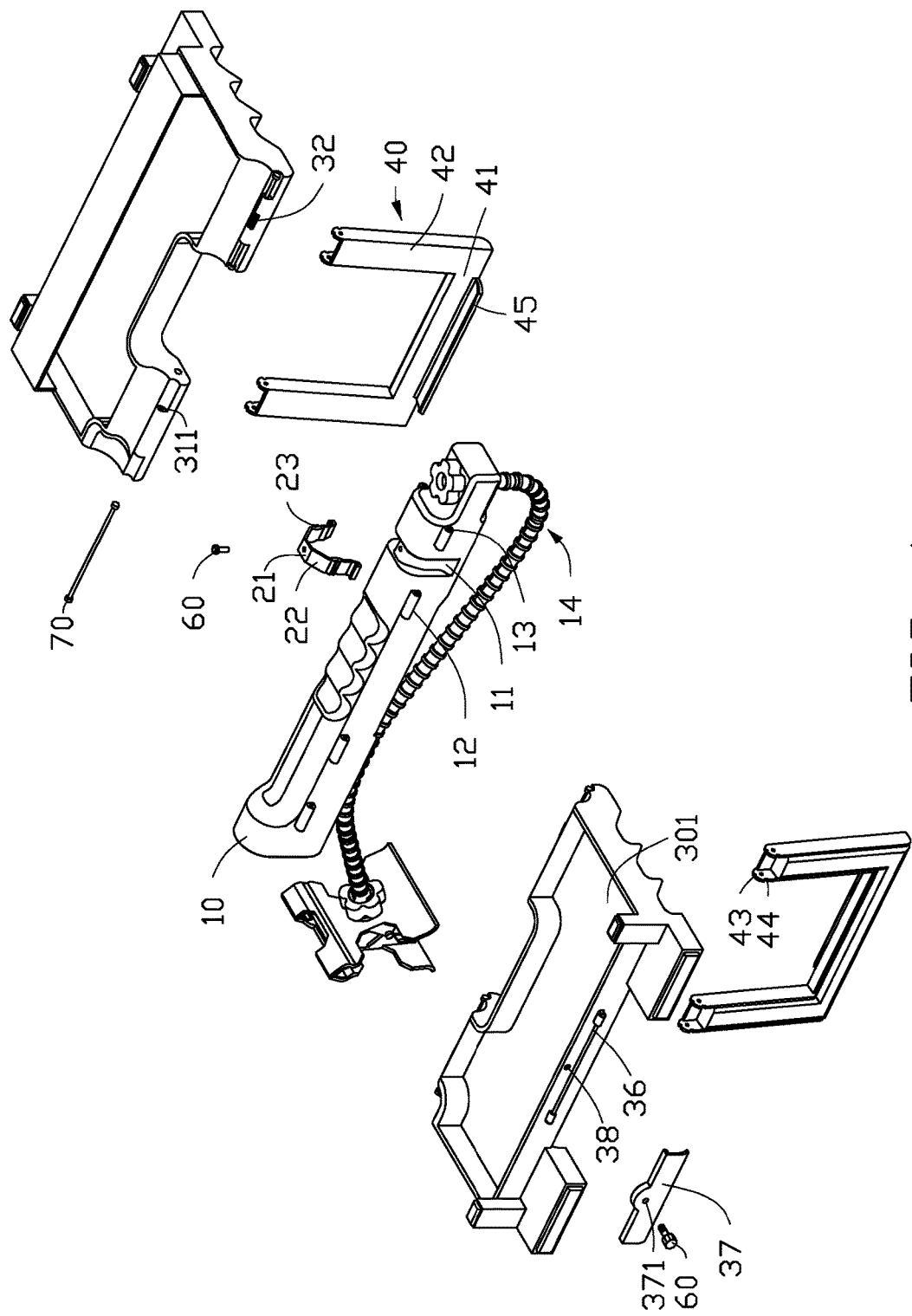
FIG. 4 is similar to FIG. 5, but shown from another aspect.

FIGS. 3 and 4 illustrate that the connecting body 10 is substantially a strip-shaped rod. A substantially U-shaped recess 11 is defined in a bottom portion of the connecting body 10 extending toward two side portions of the connecting body 10. A plurality of first connecting posts 12 protrude from two side walls of the connecting body 10 oppositely spaced from each other. In this exemplary embodiment, there are four first connecting posts 12 on each side wall. The four first connecting posts 12 are divided into two groups. As such, each group of first connecting posts 12 includes two first connecting posts 12 opposite to each other. The two groups of first connecting posts 12 are respectively positioned at two ends of the connecting body 10. A first connecting hole 13 is defined in each first connecting post 12.

Several accessories 14 are formed on the connecting body 10. The accessories include a lamp 141, a plurality of USB interfaces 142, and a switch 143. The switch 143 is configured for turning on or off the lamp 141. The lamp 141 is configured for illumination. The USB interfaces 142 are configured for connecting to external devices, such as power supplies. A clamp 144 is connected to the connecting body 10 by a connecting pipe 145. The connecting pipe 145 can be metal and can be freely deformed to move the clamp 144. The clamp 144 is configured for latching a mobile phone or a tablet computer. Each supporting plate 30 is substantially a rectangular plate.

A pair of second connecting posts 31 are positioned on a first side of each supporting plate 30, corresponding to the two groups of first connecting posts 12. A second connecting hole 311 is defined in each second connecting post 31.

A receiving chamber 33 is defined in a top surface of each supporting plate 30 and configured for assembling and receiving one of the supporting arms 40. Accordingly, the shape of the receiving chamber will correspond to the shape of the supporting arms 40. The receiving chamber 33 includes a bottom wall 331 and two side walls 332. A pair of positioning pins 333 are formed at two ends of each receiving chamber 33. A pair of positioning protrusions 334 protrude from each bottom wall 331 at two opposite sides of each bottom wall 331.

A plurality of first receiving slots 34 are defined in the top surface of each supporting plate 30 configured for supporting the electronic device 50. In this exemplary embodiment, the first receiving slots 34 are divided into two groups. Each group of first receiving slots 34 includes three first receiving slots 34 configured for positioning the electronic device 50 at different degrees of incline. Two groups of the first receiving slots 34 are positioned at two sides of the supporting plate 30 along a direction perpendicular to the connecting body 10. The first receiving slots 34 are parallel to each other.

A plurality of second receiving slots 35 are defined in the top surface of each supporting plate 30 for supporting the bottom portion of the electronic device 50 having a relative smaller size, and positioned between the two groups of first receiving slots 34. In this exemplary embodiment, there are two second receiving slots 35 positioned along a direction perpendicular to the connecting body 10 and spaced apart from each other. According to the sizes of the electronic devices 50, the electronic device can be selectively received in one of the first receiving slots 34 and the second receiving slots 35.

In this exemplary embodiment, a rear portion 301 (shown in FIG. 4) of each supporting plate 30 is a hollow structure to reduce a weight of the supporter 100 and make the supporter 100 easy to carry.

Each supporting arm 40 includes a connecting arm 41 and two rotating arms 42. The connecting arm 41 is substantially perpendicular connected between the two rotating arms 42 and forms an inverted substantially U-shaped structure together. An end of each rotating arm 42 opposite to the resisting arm 41 is connected to the supporting plate 30 by the positioning pin 333. The rotating arms 42 can be rotated relative to the positioning pins 333. A first cut 43 and a second cut 44 are defined in the end of each rotating arm 42 spaced with each other, corresponding to the positioning protrusion 334. One of the first cut 43 and the second cut 44 can be engaged with the corresponding positioning protrusion 334 to position the supporting arm 41 in a perpendicular direction or a horizontal direction. A resisting plate 45 is extended from each connecting arm 41. The resisting plates 45 are configured for resisting against each other when the electronic device 50 is supported by the supporting arms 40.

Figure 5:
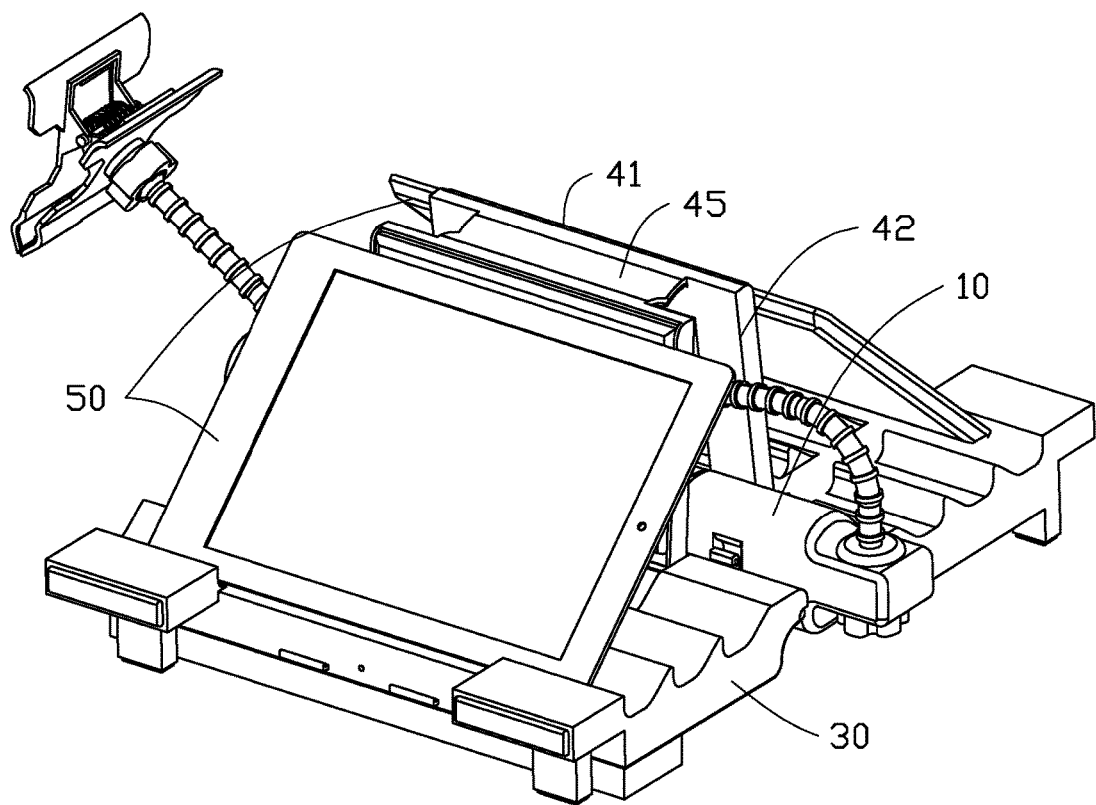
FIG. 5 is an isometric view of the supporter for electronic device of FIG. 1 used to support electronic devices, according to an exemplary embodiment.

FIG. 5 illustrates that, in assembly, each pair of second connecting post 31 is latched into a space between the two first connecting posts 31 of one of the group of connecting posts 31. Each rotating shaft 70 extends through the first connecting hole 13 of the connecting body 10 and the second connecting holes 311 of one of the supporting plates 30 to interconnect the connecting body 10 and the supporting plate 30. The end of each rotating arm 42 opposite to the resisting arm 41 is connected to the supporting plate 30 by the positioning pin 333. In use, the supporting plates 30 are rotated relative to the connecting body 10 to open the supporter 100, the supporting arms 40 are rotated toward each other and relative to the supporting plates 30. As such, the electronic device 50 can be placed on the supporting plates 30 and supported by the supporting arm 40.

In another embodiment (see FIG. 2), the supporter 100 further includes a positioning assembly configured for adjusting an angle between the two supporting plates 30. The positioning assembly includes a latching member 20, a pair of first toothed structures 23, and a pair of second toothed structures 32 meshed with the pair of first toothed structures 23.

The latching member 20 includes a fixing portion 21 and two free ends 22. The two free ends 22 are connected to two ends of the fixing portion 21 and form a substantially U-shaped structure with the fixing portion 21. The free ends 22 can be elastically deformed relative to the fixing portion 21. The pair of first toothed structures 23 is positioned on outer surfaces of the free ends 22. In this exemplary embodiment, each first toothed structure 23 includes three gear teeth. Each second toothed structure 32 is positioned on one of the second connecting posts 31. In this exemplary embodiment, each second toothed structure 32 includes three gear teeth. The latching member 20 is inserted into the recess 11 and secured to the connecting body 10 by a fastener 60, such as a screw. The first toothed structures 23 mesh with the second toothed structures 32.

To increase the angle between the two supporting plates 30, the latching member 20 is pressed to make the first toothed structure 23 disengage with the second toothed structure 32. The supporting plates 30 are rotated away from each other until the angle between the two supporting plates 30 reaches a first desired angle. The latching member 20 is depressed so that the first toothed structures 23 mesh with the second toothed structures 32 again.

To decrease the angle between the two supporting plates 30, the supporting plates 30 are directly rotated toward each other until the angle between the two supporting plates 30 reaches a second desired angle. The first toothed structures 23 maintains to mesh with the second toothed structures 32.

In other embodiment, the supporter 100 further includes a locking assembly. The locking assembly includes a fixing shaft 36, a locking member 37 and a plurality of protruding blocks 39.

The fixing shaft 36 is secured on a second side of one of the supporting plates 30 opposite to the first side. The locking member 37 is rotated connected to the supporting plate 30 by the fixing shaft 36. The protruding blocks 39 protrude from a second side of the other of the supporting plates 30. A latching slot 391 is defined in each protruding block 39.

To lock the supporter 100, the supporting plates 30 are rotated to attached with each other. The locking member 37 is rotated to latch into the latching slots 39. To unlock the supporter 100, the locking member 37 is rotated to disengaged with the latching slots 39.

In other embodiment, the locking assembly further includes a fastener 60, such as a screw, a securing hole 371 defined in the locking member 37, and a screw hole 38 defined in the supporting plate 30 corresponding to the securing hole 371. When the locking member 37 engages with the latching slots 39, the fastener 60 is extended through the securing hole 371 and screwed into the screw hole 38 to prevent the locking member 37 from disengaging with the latching slots 39.

The supporting plates 30 can be rotated to close each other until the supporting arms 40 received in the corresponding receiving chambers 33 to close the supporter 100. Therefore, the size of the supporter 100 can be reduced by half in the closed state, which makes the supporter 100 easy to carry.

It is to be understood, however, that even through numerous characteristics and advantages of the present disclosure have been set fourth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A supporter, for supporting an electronic device, comprising:
a connecting body;
a pair of supporting plates rotatably connected to the connecting body, each supporting plate comprising a receiving chamber; and
a pair of supporting arms respectively rotatably connected to the supporting plates; wherein:
when the supporter is in an open state, the pair of supporting arms are rotated to rest against each other, the pair of supporting arms and the corresponding supporting plates respectively form an angle therebetween so that the supporting arms and corresponding supporting plates are positioned in a manner to cooperatively support the electronic device, and
when the supporter is in a closed state, the pair of supporting arms are received in the corresponding receiving chambers.

2. The supporter of claim 1, wherein the receiving chamber comprises a pair of positioning pins, the supporting arms are rotatably connected to the supporting plate by the positioning pins.

3. The supporter of claim 2, wherein each supporting arm comprises a connecting arm and two rotating arms, the connecting arm is substantially perpendicularly connected between the two rotating arms and forms an inverted substantially U-shaped structure together.

4. The supporter of claim 3, wherein the receiving chamber further comprises a pair of positioning protrusions, and an end of each rotating arm defines a first cut and a second cut spaced with each other, corresponding to one of the positioning protrusions, one of the first cut and the second cut is selectively engaged with the corresponding positioning protrusion to position the supporting arm in one of a perpendicular direction and a horizontal direction.

5. The supporter of claim 2, wherein each supporting plate defines a plurality of first receiving slots, the first receiving slots are parallel to each other, and positioned at two sides of the supporting plate along a direction perpendicular to the connecting body.

6. The supporter of claim 5, wherein each supporting plate further defines a plurality of second receiving slots, the second receiving slots are parallel to each other, and positioned at two sides of the supporting plate along a direction perpendicular to the connecting body.

7. The supporter of claim 1, further comprises a positioning assembly, wherein the positioning assembly comprises a latching member, a pair of first toothed structures, and a pair of second toothed structures, the latching member is secured to the connecting body, the pair of first toothed structure is positioned on the latching member, the pair of second toothed structure is positioned on the supporting plates, the first toothed structures mesh with the second toothed structures.

8. The supporter of claim 7, wherein the latching member comprises a fixing portion and two free ends, the two free ends are connected to two ends of the fixing portion, the pair of first toothed structures is positioned on outer surfaces of the free ends.

9. The supporter of claim 1, further comprises a locking assembly, wherein the locking assembly comprises a fixing shaft, a locking member and a plurality of protruding blocks, the fixing shaft is secured on one of the supporting plates, the locking member is rotatably connected to the supporting plate by the fixing shaft, the protruding blocks protrude from the other of the supporting plates, each protruding block defines a latching slot, the locking member is engaged with the latching slots.

10. The supporter of claim 9, wherein the locking assembly further comprises a fastener, the latching member defines a securing hole, one of the supporting plate defines a screw hole corresponding to the securing hole, when the locking member engages with the latching slots, the fastener is extended through the securing hole and screwed into the screw hole.

11. A supporter comprising:
a connecting body;
a pair of supporting plates rotatably connected to the connecting body;
a pair of supporting arms rotatably connected to the supporting plates, and capable of being received in the supporting plates; and
a positioning assembly, the positioning assembly comprising:
a latching member secured to the connecting body;
a pair of first toothed structures positioned on the latching member; and
a pair of second toothed structures positioned on the supporting plates meshing with the pair of first toothed structures.

12. The supporter of claim 11, wherein the latching member comprises a fixing portion and two free ends, the two free ends are connected to two ends of the fixing portion, the pair of first toothed structures is positioned on outer surfaces of the free ends.

13. The supporter of claim 11, wherein each supporting plate comprises a receiving chamber configured for receiving one of the supporting arms, the receiving chamber comprises a pair of positioning pins, the supporting arms are rotatably connected to the supporting plate by the positioning pins.

14. The supporter of claim 13, wherein each supporting arm comprises a connecting arm and two rotating arms, the connecting arm is substantially perpendicularly connected between the two rotating arms and forms an inverted substantially U-shaped structure together.

15. The supporter of claim 14, wherein the receiving chamber further comprises a pair of positioning protrusions, and an end of each rotating arm defines a first cut and a second cut spaced with each other, corresponding to one of the positioning protrusions, one of the first cut and the second cut is selectively engaged with the corresponding positioning protrusion to position the supporting arm in one of a perpendicular direction and a horizontal direction.

16. The supporter of claim 11, wherein each supporting plate defines a plurality of first receiving slots, the first receiving slots are parallel to each other, and positioned at two sides of the supporting plate along a direction perpendicular to the connecting body.

17. The supporter of claim 16, wherein each supporting plate further defines a plurality of second receiving slots, the second receiving slots are parallel to each other, and positioned at two sides of the supporting plate along a direction perpendicular to the connecting body.

18. The supporter of claim 11, further comprises a locking assembly, wherein the locking assembly comprises a fixing shaft, a locking member and a plurality of protruding blocks, the fixing shaft is secured on one of the supporting plates, the locking member is rotatably connected to the supporting plate by the fixing shaft, the protruding blocks protrude from the other of the supporting plates, each protruding block defines a latching slot, the locking member is engaged with the latching slots.

19. The supporter of claim 18, wherein the locking assembly further comprises a fastener, the latching member defines a securing hole, one of the supporting plate defines a screw hole corresponding to the securing hole, when the locking member engages with the latching slots, the fastener is extended through the securing hole and screwed into the screw hole.

* * * * *